US009677629B2

United States Patent
Boyle et al.

(10) Patent No.: US 9,677,629 B2
(45) Date of Patent: Jun. 13, 2017

(54) MULTIPLE PIECE PAD CLIP (71) Applicant: AKEBONO BRAKE INDUSTRY CO., LTD., Chuo-ku, Tokyo (JP)

(72) Inventors: Brian Lewis Boyle, Farmington Hills, MI (US); Gang Lou, Rochester, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 66 days.

(21) Appl. No.: 14/467,115

(22) Filed: Aug. 25, 2014

(65) Prior Publication Data
US 2016/0053837 A1 Feb. 25, 2016

(51) Int. Cl.
*F16D 65/40* (2006.01)
*F16D 65/097* (2006.01)
*F16D 55/225* (2006.01)
*F16D 65/00* (2006.01)

(52) U.S. Cl.
CPC ....... *F16D 65/0978* (2013.01); *F16D 55/225* (2013.01); *F16D 65/0006* (2013.01); *F16D 65/0972* (2013.01); *F16D 65/0974* (2013.01)

(58) Field of Classification Search
CPC ............ F16D 65/0971; F16D 65/0972; F16D 65/0977; F16D 65/0978
USPC .......................................... 188/73.35–73.38
See application file for complete search history.

(56) References Cited

U.S. PATENT DOCUMENTS 3,592,301 A * 7/1971 Auth ................... F16D 65/0977
188/73.32
4,243,123 A * 1/1981 Watanabe ........... F16D 65/0972
188/73.38
4,658,938 A * 4/1987 Thiel .................. F16D 65/0977
188/73.35
4,666,025 A 5/1987 Rubin
5,699,882 A 12/1997 Ikegami et al.
6,003,642 A 12/1999 Mori et al.
(Continued)

FOREIGN PATENT DOCUMENTS

JP 08-284983 A1 11/1996

OTHER PUBLICATIONS

Co-pending U.S. Appl. No. 13/861,549, filed Apr. 12, 2013, published as US2014/0305753.
Co-pending U.S. Appl. No. 14/188,980, filed Feb. 25, 2014.

*Primary Examiner* — Christopher Schwartz
(74) *Attorney, Agent, or Firm* — The Dobrusin Law Firm, P.C.

(57) ABSTRACT

A pad clip comprising two or more discrete pieces comprising: one or more clip body sections including a bridge attachment segment located at a bridge end, a spring attachment segment located at a spring end, or both; and one or more bridge sections, one or more retraction springs, or both; wherein the two or more discrete pieces are adapted to be attached together at the bridge attachment segment, spring attachment segment, or both. The teachings also include a method of forming the pad clip, comprising: forming two or more clip body sections, each clip body section including a spring attachment segment; forming one or more retraction springs; attaching the one or more retraction springs to the spring attachment segment of the two or more clip body sections; and installing the pad clip about a support bracket of a brake assembly.

16 Claims, 5 Drawing Sheets (56) References Cited

U.S. PATENT DOCUMENTS

| | | | |
|---|---|---|---|
| 7,219,773 B2 * | 5/2007 | Ono | F16D 65/0971 188/250 E |
| 7,318,503 B2 | 1/2008 | Farooq | |
| 8,376,092 B2 | 2/2013 | Lethorn | |
| 8,397,880 B2 | 3/2013 | Chelaidite | |
| 2007/0251772 A1 * | 11/2007 | Tsurumi | F16D 65/095 188/73.38 |
| 2008/0006489 A1 * | 1/2008 | Morio | F16D 65/0977 188/73.38 |
| 2008/0190715 A1 * | 8/2008 | Kang | F16D 65/0972 188/73.1 |
| 2010/0243385 A1 * | 9/2010 | Kaneko | F16D 65/0977 188/73.31 |
| 2012/0205205 A1 * | 8/2012 | Lethorn | F16D 65/0977 188/234 |
| 2012/0222925 A1 * | 9/2012 | Kaneko | F16D 65/0977 188/73.38 |
| 2014/0339026 A1 | 11/2014 | Gutelius et al. | |

* cited by examiner

MULTIPLE PIECE PAD CLIP

FIELD

The present teachings relate to a modular pad clip that reduces waste, increases flexibility in manufacturing, and includes one or more features that assist in supporting a brake pad and/or retracting a brake pad after a brake apply.

BACKGROUND

Generally, a brake system, such as a disc brake system, includes a rotor, a caliper body, a support bracket, and two or more brake pads, such as an inboard brake pad and outboard brake pad on opposing sides of the rotor. The two or more brake pads are mounted and located adjacent to the support bracket so that the brake pads move axially, along the rotor axis, a piston bore axis, or both, toward and away from the rotor. The brake system may include a pad clip that attaches to the brake system between the support bracket and the brake pads so that the brake pads are retained within the brake system and move along the pad clip. The disc brake system may also include one or more springs to assist in retracting the brake pads away from a rotor when the brakes are released, and the one or more springs may be a part of the pad clip. Examples of pad clips and pad retraction springs are disclosed in U.S. Pat. Nos. 7,318,503; 6,003,642; and 5,699,882; and U.S. application Ser. Nos. 13/861,549 and 14/188,980; all of which are expressly incorporated herein by reference for all purposes.

In non-braking conditions, the brake system may experience forces that move one or more components of the brake system into contact with each other, creating a rattling noise that may be audible to an occupant of the vehicle in which the brake system is installed. The industry is constantly seeking new and improved pad clips to reduce the sliding resistance of the brake pads along the support bracket; prevent elements within the brake system from directly contacting other elements within the brake system (e.g., preventing a brake pad from directly contacting the support bracket); reduce noise, vibration, and harshness; or a combination thereof.

A challenge faced in creating pad clips is that in the manufacturing process, expensive tooling is required. For example, creating a pad clip may require a 36 stage progressive die. This may result in a complicated tool that is expensive, requires long lead times, and is difficult to troubleshoot or modify. Also, once tooled, there is little flexibility in making design changes. As such, the pad clips are not easily customizable for various brake systems, thereby requiring separate tooling for each brake system or any modifications to a brake system, which increases costs for the manufacturer and the purchaser. In addition, the multi-stage die requires a high tonnage press, thereby further increasing stamping costs.

Another challenge faced in creating pad clips is the significant amount of waste generated during the manufacturing process, which may be due to the complex shape of the pad clip. In some instances, more material is scrapped than is used in the finished part. For example, for every 9 gram pad clip produced, an additional 31 grams of material may be scrapped due to the shape of the part.

It would be attractive to have a brake system that is free of audible rattling during running, non-braking conditions, or both. There is this a need for a pad clip that provides stability to the brake pad, prevents or reduces contact between elements of the brake system, and reduces noise, vibration and harshness. There is further a need for a pad clip with flexibility in customization and modification, reduced manufacturing costs, reduced waste material produced, or a combination thereof.

SUMMARY

The present teachings provide one or more solutions to the needs above by providing a device that substantially prevents the brake pads from contacting the support bracket, assists in retracting the brake pads, or both and creating audible noises. The present teachings provide a pad clip that can be customized and reduce waste while also providing stability to the brake pads within the support bracket.

One possible illustration of features of the present teachings include a pad clip comprising: two or more discrete pieces, which comprise one or more clip body sections including a bridge attachment segment located at a bridge end, a spring attachment segment located at a spring end, or both; and one or more bridge sections, one or more retraction springs, or both; wherein the two or more discrete pieces are adapted to be attached together at the bridge attachment segment, spring attachment segment, or both.

Another possible illustration of features of the present teachings include a brake assembly comprising a caliper; a support bracket having a leading end and a trailing end, wherein the leading end, the trailing end, or both, have one or more projections; a rotor extending through the support bracket; two or more brake pads located within the support bracket on opposing sides of the rotor; and a modular pad clip located about the leading end of the support bracket, trailing end of the support bracket, or both, wherein the modular pad clip comprises a plurality of discrete pieces adapted to be attached to each other including: two or more clip body sections, wherein the two or more clip body sections each include a bridge attachment segment located at a bridge end and a spring attachment segment located at a spring end; a bridge section attached to the two or more clip body sections at the bridge attachment segment so that the two or more clip body sections are connected yet separated by a distance that is sufficiently large to allow the rotor to extend therethrough; and one or more retraction springs attached to the spring attachment segment of each of the two or more clip body sections.

The present teachings further include a method of forming a pad clip comprising forming two or more clip body sections, each clip body section including a spring attachment segment; forming one or more retraction springs; attaching the one or more retraction springs to the spring attachment segment of the two or more clip body sections; and installing the pad clip about a support bracket of a brake assembly.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing an improved pad clip for use in a disc brake system for use with vehicles. For example, the disc brake system may be used with almost any vehicle (e.g. car, truck, bus, train, airplane, or the like). Alternatively, the disc brake system may be integrated into assemblies used for manufacturing or other equipment that requires a brake such as a lathe, winder for paper products or cloth, amusement park rides, wind turbines, or the like. However, the present teachings are most suitable for use with a passenger vehicle (e.g., a car, truck, sports utility vehicle, or the like).

The present teachings provide a brake assembly that may be used to create a braking force. Generally, a brake assembly includes a caliper body, a rotor, a support bracket, and one or more brake pads.

The caliper may function to support one or more brake pads within a brake system, house one or more pistons, axially move, assist in creating a brake apply, or a combination thereof. The caliper may be connected to a knuckle via the support bracket or the caliper may be directly connected to the knuckle. The caliper body may include a bridge, one or more fingers, one or more piston bores, or a combination thereof. The caliper may include one or more pistons that move during a brake apply to create a friction force. The caliper may include one or more piston bores that each house a piston. Each of the pistons may extend along the piston bore axis to create a brake apply. The one or more piston bores that house the one or more pistons may include any, all, or a combination of a fluid inlet, a closed wall, a front opening, a cylindrical side wall that includes an annular groove near the front opening, and a seal in the annular groove. The caliper may include one or more pistons on each side of the caliper so that the caliper is substantially static during a brake apply (e.g., a fixed caliper). The brake assembly may include opposing pistons. Preferably, the brake assembly includes one or more pistons on one side of a rotor so that when the piston moves a brake pad into contact with a rotor, the caliper moves until fingers move an opposing brake pad into contact with an opposing side of the rotor (e.g., a floating caliper).

The support bracket may function to connect the brake system to a corner module (e.g., a knuckle). The support bracket may be any static part of the brake system. The support bracket may directly or indirectly support the brake pads. The support bracket may include one or more pad clips that assist in holding the one or more brake pads. The caliper and the support bracket may be one unitary piece. The support bracket and caliper may be two discrete pieces. The support bracket may connect the caliper indirectly to a corner module. The support bracket may provide support to the caliper so that the caliper moves during a brake apply. The support bracket may be sized so that the caliper extends on both sides of the support bracket and a rotor extends through a center of the support bracket. Preferably, the support bracket includes at least two opposing projections and/or at least two opposing abutments that guide the brake pads during a brake apply and retain the brake pads within the support bracket during non-braking conditions (e.g., running). The abutments of the support bracket may be a generally flat, vertical surface. A pair of brake pads may be used in the brake assembly, and the pair of brake pads may extend from an abutment on a trailing end of the support bracket to an abutment on a leading end of the support bracket. The support bracket may have two projections on the leading end and two opposing projections on the trailing end. The projections may be separated by a gap that accommodates the rotor. The projections may be any shape. The projections may have an upper portion, a lower portion (e.g., an underside), a face, one or more sides, or combination thereof. Preferably, the projections have one or more generally flat surfaces.

The caliper body may be in communication with one or more brake pads (e.g., an inboard brake pad and an outboard brake pad that are on opposing sides of the rotor). The brake pads may function to create a friction force during a brake apply. The brake pads may function to be axially moved during a brake apply, a brake retract, or both, in relation to a rotor axis, a piston bore axis, or both. The brake pads may include a pressure plate and friction material. The brake pads may include a pressure plate with friction material on at least a portion of one side of the pressure plate. During a brake apply, the friction material contacts the rotor of the brake assembly to slow the vehicle or bring the vehicle to a stop. The friction material may cover only a portion (e.g., not the entire side) of the pressure plate so that some of the pressure plate on that side is exposed. The brake pad (e.g., pressure plate, friction material, or both) may have a shape that can fit within a boundary defined by the pad clip, support bracket, or both. For example, the brake pad may include an ear portion on each side of the brake pad that fits underneath the projection and abuts against the abutment of the support bracket and/or the pad clip.

The brake pads may be held in communication with the support bracket with one or more pad clips. The one or more pad clips, and preferably a plurality of pad clips, may function to hold one or more brake pads, allow one or more brake pads to move along an axis of a rotor (e.g., an axis around which the rotor rotates), create a low friction surface for the brake pads to move along, or a combination thereof. Preferably, the pad clips generally match the shape of a portion of the support bracket (e.g., having a portion shaped to fit within an abutment of the support bracket, around at least a portion of a projection, or both), have a generally complementary shape to at least a portion of the brake pad, or both. Preferably, at least one pad clip is installed on one side (e.g., leading end) of the one or more brake pads and a second pad clip is installed on the opposing side (e.g., trailing end) of the one or more brake pads. The brake assembly may include two or more pad clips (e.g., one pad clip for each abutment and/or projection of the brake assembly).

The pad clip may be formed of discrete pieces. The ability to combine discrete pieces (e.g., to form a modular pad clip) may allow for greater flexibility and adaptability for particular brake assemblies. The pad clip may be formed of one or more clip body sections, one or more pad retraction springs, one or more bridge sections, or any combination thereof. For example, a pad clip may include two clip body sections bridged by a bridge section, with a retraction spring attached to each clip body section. Each of the discrete pieces may be chosen and assembled based upon the application (e.g., dimensions of the support bracket and/or brake pad; material desired; amount of force required to be exerted or withstood; or combination thereof). For example, during assembly of the pad clip, a bridge section may be selected because it has a particular length. A particular clip body section may be selected based on the contours of the support bracket, the brake pad, or both. A particular retraction spring may be selected because of the energy it is capable of storing during a brake apply, the force the spring can exert on the brake pad during a brake retract, the location of installation within the assembly (e.g., installed for retracting an inboard brake pad or an outboard brake pad), or combination thereof. It is therefore possible that two discrete assembled modular pad clips, when compared, may include one or more of the same sections and/or one or more different sections. For example, a first assembled pad clip may include two clip body sections bridged by a bridge section. A second assembled pad clip may include identical clip body sections to the first assembled pad clip but may be bridged by a bridge section of a different length, thickness, material, the like, or combination thereof, from the first assembled pad clip. The combination of discrete pieces may also reduce waste, as smaller, simpler components may be produced and may require smaller, less expensive presses for stamping. The shape of the discrete pieces may allow more pieces to be stamped from a single metal sheet. Less waste may be produced if smaller segments, such as multiple generally rectangular and/or planar bridge sections, can be made from a single sheet than if a unitary pad clip of a complex shape must be stamped from that sheet.

The clip body section of the present teachings may function to secure the pad clip to a support bracket, secure the brake pad within the brake assembly, reduce or prevent rattling of the brake pad within the brake assembly (e.g., audible noises caused by the brake pad against the support bracket), or combination thereof. The clip body section may connect an ear of one or more brake pads to the support bracket. The clip body section may generally match the shape of a portion of the support bracket (e.g., having a shape that fits around a projection of the support bracket, against an abutment of the support bracket, or both). The clip body section may include two or more ends. For example, the clip body section may include a bridge end and a spring end. The bridge end may function to provide an area for attaching a bridge section to join two or more clip body sections together. The spring end may function to provide an area for attaching a retraction spring. The spring end may function to reduce or eliminate contact between the brake pad and the support bracket, store energy and flex as a result of movement of the brake pad within the brake assembly, or both. The clip body section may include any, all, or a combination of segments, including a bridge attachment segment, a spacing segment, a projection segment, an abutment segment, and a spring attachment segment. The clip body section may include one or more features for holding the outside of the support bracket so that the pad clip is free of movement during a brake apply, a brake retraction, during brake wear, or a combination thereof. For example, securing tabs may be located at and extend from one or more edges of the clip body for further holding the clip body section in place within, around, or against the support bracket.

The clip body section may include a bridge attachment segment at the bridge end. The bridge attachment segment may function to provide an area of attachment for a bridge section, orient the bridge section at a proper angle relative to the clip body section to fit within the brake assembly, or both. The bridge attachment segment may be generally planar. The bridge attachment segment may have one or more attachment apertures, projections (e.g., bosses), or both, for attaching a bridge segment. The bridge attachment section may be sufficiently large to receive one or more fasteners to connect one or more bridges to the one or more clip body sections. The one or more bridge attachment sections may receive one or more welds, one or more rivets, adhesive, bolts, nuts, peened sections, or a combination thereof so that a connection is formed. The bridge attachment segment may be angularly oriented in relation to an adjacent segment of the clip body section (e.g., the spacing segment). The angle may be any angle that allows the pad clip to fit within the brake assembly. The angle may generally match the contours or shape of the support bracket. The angle may be about 180° or less, about 150° or less, or about 135° or less. The angle may be about 90° or more, about 110° or more, or about 120° or more.

A spacing segment may be connected to the bridge attachment segment of the clip body section. The spacing segment may provide sufficient length or height to the clip body section to allow a bridge section to extend over the rotor of the brake assembly. The spacing segment may be sufficiently long so that the bridge connection segment and the projection segment are properly positioned on a support bracket. The spacing segment may be generally planar. The spacing segment may have one or more curves, contours, arcs, bends, linear segments, angles, the like, or a combination thereof. The spacing segment may generally match the shape of the adjacent portion of the support bracket.

The spacing segment may connect to a projection segment. The projection segment may function to secure the pad clip on a projection of the support bracket; reduce or prevent movement of the pad clip within the brake assembly; assist in reducing or eliminating acceleration of the brake pad to prevent the brake pad from contacting the support bracket; or combination thereof. The projection portion may be shaped to generally match the shape of the projection of the support bracket. The projection portion may include one or more securing tabs. The securing tabs may extend from a side edge of any portion of the projection segment to cover a portion of the projection (e.g., one or more securing tabs may be generally perpendicular to the portion of the projection segment from which it extends). The projection segment may include an upper portion, a face portion and a lower portion.

The upper portion of the projection segment may function to assist in securing the pad clip to the projection; store energy as a brake pad accelerates toward the pad clip; assist in reducing or preventing the brake pad from contacting the support bracket; or any combination thereof. The upper portion may be generally located above the projection of the support bracket when the pad clip is installed in the brake assembly. The upper portion may have one or more points or lines of contact with the projection of the support bracket.

For example, the area where the upper portion of the projection segment and the spacing segment connect (e.g., forming a corner or bend in the clip body section) may contact an area of the projection of the support bracket (e.g., the base of the projection). The upper portion may contact the projection along all or a portion of the length of the top of the projection of the support bracket. The upper portion may generally rest on the upper portion of the projection. The pad clip may be connected to the projection of the support bracket at the one or more contact points. The upper portion of the projection segment may be generally flat or planar. The upper portion may generally match the shape of the projection. The upper portion may extend away from a portion of the projection of the support bracket. For example, the upper portion may contact the projection at its base and then extend at an angle of about 90° or less relative to the projection (e.g., about 45° or less, about 30° or less, or about 10° or less), away from the end of the projection to form a gap between the end of the projection and the area where the upper portion and the face portion of the projection segment join. This gap may assist in reducing or eliminating acceleration of the brake pad to prevent the brake pad from contacting the support bracket. The upper portion of the projection segment may be generally perpendicular to one or more other segments of the clip body section (e.g., forming an angle of about 90° in relation to a plane extending from the spacing segment, abutment segment, face portion, or combination thereof). The upper portion of the projection segment may form an angle of about 90° or less in relation to a plane extending from the spacing segment, abutment segment, face portion, or combination thereof.

The upper portion of the projection segment may be connected to a face portion of the projection segment. The face portion may function to connect the upper portion and the lower portion of the projection segment, extend around the projection, or both. The face portion may assist in creating a connection between the projection and the pad clip. The face portion may allow for the upper portion, the lower portion, or both, to be movable relative to the projection while a secured connection is maintained. The face portion may have a generally complementary shape to the end of the projection, a shape that generally matches the shape of the end of the projection of the support bracket, or both. The face portion may be generally planar. The face portion may have one or more curves, contours, bends, linear segments, angles, the like, or combination thereof (e.g., that extend toward the face of the projection, away from the face of the projection, or both). The face portion may have a length greater than or about equal to the length of the end of the face of the projection. The face portion may be generally parallel to the end of the projection of the support bracket. For example, a projection having a generally flat end may be generally parallel to a generally flat face portion. The face portion may have one or more contact points with the end of the projection of the support bracket. The face portion may make no direct contact with the end of the projection.

The face portion of the projection segment may connect the upper portion to the lower portion. The lower portion of the projection segment may function to hold a brake pad in place, prevent contact between the support bracket and a brake pad, decelerate a brake pad as it moves toward the support bracket, or combination thereof. The lower portion may extend along an underside of the projection, proximate to an ear of a brake pad, between the support bracket and a brake pad, or a combination thereof. The lower portion may have one or more contact points or lines, two or more contact points or lines, or three or more contact points or lines with the projection of the support bracket. For example, the area where the lower portion and the abutment segment connect (e.g., forming an angle or a bend) may contact an area on the underside of the projection of the support bracket (e.g., at the base of the projection). The lower portion may be generally flat and/or planar. The lower portion may have one or more bends, curves, contours, angles, the like, or combination thereof (e.g., that extend toward the underside of the projection, away from the underside of the projection, or both). The lower portion may include one or more arcuate segments that extend away from or toward the projection, or both. The lower portion may have one or more linear segments. The lower portion may be generally parallel with the underside of the projection of the support bracket. The lower portion may generally match the shape of the underside of the projection.

The lower portion may connect to an abutment segment. The abutment segment may function to create a sliding surface for the brake pad during axial movement in relation to the rotor axis, piston bore axis, or both. The abutment segment may function to act as a barrier between the abutment of the support bracket and the brake pad, prevent the brake pad from directly and/or indirectly contacting the support bracket, or a combination thereof. The abutment segment may extend between the projection segment and a spring attachment segment. The abutment segment may form an angle with the lower portion of the projection segment that is about 150° or less, about 120° or less, or about 90° or less. The abutment segment may form an angle with the lower portion of the projection segment that is about 45° or more, about 60° or more, or about 80° or more. The abutment segment may have any shape or position that substantially reduces or eliminates noise, vibration, and harshness (e.g., as compared to a brake system with no pad clip). The abutment segment preferably has a length substantially similar to the length of the abutment of the support bracket or smaller. The abutment may have a width approximately equal to or greater than the distance a brake pad travels between braking and non-braking conditions so that friction is reduced along the entire distance (e.g., in an axial direction relative to the axis of the rotor). The abutment segment may be generally parallel to the abutment of the support bracket. The abutment segment may be generally planar. The abutment segment may have one or more bends, curves, arcs, contours, linear segments, angles, the like, or combination thereof. The abutment segment may include one or more curves that extend toward the abutment, away from the abutment, or both. The abutment segment may create one or more points or lines of contact with the abutment. The abutment segment may generally rest against the abutment. The abutment segment may be located away from the abutment (e.g., not contacting the abutment of the support bracket). The abutment segment may be forced into contact with the support bracket as the abutment segment flexes and stores energy from the movement of the brake pad. The abutment segment may be generally angled away from the abutment of the support bracket (e.g., creating a gap between the abutment segment and the abutment, wherein the gap distance generally increases as the abutment segment approaches the projection segment or the spring attachment segment). The abutment segment may extend away from the abutment at a sufficient angle so that during a braking event, the one or more brake pads are moved along the abutment segment to generate a braking force, to retract to a running position, or both. The abutment segment may extend away from the abutment at a sufficient angle so that the abutment segment produces a force on the brake pad during running conditions so that the brake pad is substantially prevented from moving, the brake pad is substantially prevented from rattling, the brake pad is substantially prevented from contacting the abutment, or a combination thereof. For example, the abutment segment may extend at an angle of about 5° or more, about 10° or more, or about 15° or more away from the abutment.

A spring attachment segment may be located at the spring end of the pad clip. The spring attachment segment may function to provide an area of attachment for a retraction spring. The spring attachment segment may function to hold a brake pad, store energy upon movement of a brake pad, reduce or prevent contact between the support bracket and the brake pad, or a combination thereof. The spring, attachment segment may include one or more attachment apertures, projections (e.g., bosses), or both, or another feature for attachment of the retraction spring. The spring attachment segment may have any shape that reduces noise, vibration, and harshness (e.g., as compared with a brake assembly with no pad clip); holds the brake pad within the brake assembly; reduces or eliminates contact between the brake pad and the support bracket; or combination thereof). The spring attachment segment may be generally planar. The spring attachment segment may have one or more bends, curves, arcs, contours, linear segments, angles, the like, or combination thereof. The spring attachment segment may include one or more curves that extend toward the support bracket (e.g., a base of the support bracket extending from the abutment), away from the support bracket, or both. The spring attachment segment may create one or more points or lines of contact with the support bracket. The spring attachment segment may generally rest against the support bracket (e.g., at the base of the support bracket extending from the abutment). The spring attachment segment may be located away from the support bracket (e.g., not contacting the support bracket). The spring attachment segment at one or more points or lines of contact may be forced into contact with the support bracket as it flexes and stores energy from the movement of the brake pad. The spring attachment segment may extend from the abutment segment at an angle. The angle may be about 45° or more, about 60° or more, or about 90° or more (e.g., when the abutment segment is shorter than the height of the abutment). The angle may be about 180° or less, about 150° or less, or about 120° or less.

The pad clip may include one or more bridge sections. The bridge section may function to connect two or more pad clips within a brake assembly. The bridge section may function to stabilize the pad clip within the brake assembly, such as by providing stiffness to the pad clip so it does not twist and/or move during a brake apply, a brake retraction, during brake wear, or a combination thereof. The bridge section may function to ease installation of the pad clip (e.g., so that a single clip is installed rather than multiple clip body sections separately installed). The bridge section may extend over a gap of the support bracket (e.g., a gap that the rotor rotates through). The bridge section may separate two or more clip body sections by a distance that is sufficient to accommodate a rotor. The height of the bridge section within the brake assembly may be high enough so that a rotor may pass under the bridge section and through the gap without any contact between the rotor and the bridge section. The bridge section may have any shape that accomplishes the functions above. The bridge section may be generally planar. The bridge section may have one or more generally straight edges. The bridge section may have one or more bends, curves, arcs, contours, linear segments, angles, the like, or combination thereof in the body of the bridge section, one, or more edges of the bridge section, or both. The bridge section may include one or more attachment apertures, projections (e.g., bosses) or both, for attaching the bridge section to one or more clip body sections (e.g., at the bridge attachment segment). Preferably one or more attachment apertures, projections (e.g., bosses), or both, are located at each end of the bridge section. The bridge section may be any length, such as a length greater than or equal to the gap that accommodates the rotor.

The pad clip may include one or more retraction springs. The retraction springs may function to assist in retracting a brake pad upon a brake release; flex and store energy during a brake apply; reduce friction for a brake pad to move or slide across; or combination thereof. The retraction springs may flex and store energy due to the force applied from the brake pads being pushed toward the rotor during a brake apply, and then release the stored energy and exert a force on the brake pad during a brake release to cause the brake pads to retract and move away from the rotor. During a brake release, the retraction springs may assist in forcing the brake pad to retract axially (in relation to the axis of the rotor) away from the rotor so the friction material of the brake pad is no longer contacting the rotor, an air gap is created between the face of the rotor and the face of the brake pad, or both. A retraction spring may be attached to the clip body section of the pad clip at the spring attachment segment at the spring end. The retraction spring may include one or more attachment apertures, projections (e.g., bosses), or both, for securing the spring to the clip body section (e.g., the spring attachment segment) of the pad clip.

The retraction spring may exert a force axially, in relationship to the rotor, in the retract direction. The retraction spring may apply any amount of force that assists the brake pads in moving axially, relative to the rotor, after a brake apply. Each retraction spring may exert a different force depending on the location of the line of contact with the brake pads. Preferably, the retraction spring may exert substantially the same force at each line of contact with the brake pads. The force of the retraction springs may varied by selecting a retraction spring that exerts a different force. The retraction spring may each exert an axial force in the retract direction of about 5 N or more, about 10 N or more, about 15 N or more, or about 20 N or more. The one or more arms may each exert an axial force in the retract direction of about 45 N or less, about 40 N or less, or about 35 N or less. Preferably, each retraction spring arm will exert a force of between about 5 N to about 25 N. Preferably, the brake may include an inboard brake pad and an outboard brake pad and the retraction springs will apply substantially the same amount of force to both brake pads in the retract direction.

The retraction springs may be any shape, width, thickness, design, any material properties, or the like, that causes a brake pad to retract. The properties and features of the retraction spring may be selected based on the application for which the retraction springs will be used. Preferably, the retraction springs include a friction material arm that contacts the brake pad (e.g., the side of the brake pad with the friction material located thereon) during a brake apply, a brake release, or both. The retraction spring may also include a pressure plate arm located on the opposing side of the brake pad (e.g., the pressure plate side). The retraction spring may include a sliding segment along which a brake pad moves (e.g., toward the face of the rotor, away from the face of the rotor, or both) during a brake apply, a brake retract, or both. The retraction spring may be formed from multiple pieces. The retraction spring may be formed of a single piece of material that is bent or otherwise shaped into a desired shape or configuration. The retraction spring may include one or more cutouts. The cutouts may function to create sites for localized yielding of the retraction spring as the brake pad wears. This may allow for control of where along the retraction spring length plastic deformation, elastic deformation, or both, may occur. The cutouts may function to reduce the weight of the spring within the brake assembly. The cutouts may function to allow the spring to be bent or otherwise shaped into the desired shape or configuration.

The discrete sections of the pad clip (e.g., one or more of a clip body section, bridge section, retraction spring, the like, or combination thereof) may be attached together to form a single modular pad clip for use in a brake assembly. Any method of attachment can be used to attach the discrete sections together, including the use of bonding and/or fusion techniques (e.g., melting), adhesives, fasteners (e.g., screws, rivets, pins, sheet-metal nuts, hinges, latches, detents, threaded fasteners), brazing, soldering, riveting, staking operations, peening, spot welding, crimping, clinching, the like, or combination thereof. The attachment apertures and/or projections (e.g., bosses) of one or more of the discrete sections may assist in attaching the discrete sections. For example, one or more attachment apertures of one section and one or more attachment apertures of another section can be lined up (e.g., one section on top of another section) in the desired location and a fastener may be inserted into the one or more attachment apertures. In another example, one discrete section may have an attachment aperture and another discrete section may have a boss that fits within the attachment aperture to perform a staking operation. The configuration of the discrete sections can be customized depending on the application and the dimensions of the support bracket. For example, the bridge section can hold the clip body sections at a particular distance apart, depending on the size of the rotor, the gap of the support bracket, or both. One or more attachment apertures, projections (e.g., bosses) or both, at each end of the bridge section may be lined up to one or more attachment apertures, projections (e.g., bosses), or both, of the bridge attachment segment (e.g., one section on top of another) to secure the bridge while maintaining the chosen distance. Multiple attachment apertures and/or projections (e.g., bosses) in any of the discrete sections of the pad clip may increase the ability to customize the configuration of the modular pad clip when it is assembled. For example, a bridge section having three or more attachment apertures or bosses may allow the same bridge section to be used in multiple differently configured brake assemblies since the distance between clip body sections can be customized. The end of the bridge section may be flush and/or may not be flush with an outer edge of the clip body section. The location of the retraction spring on the spring attachment segment may be similarly customized to assist in creating a custom brake pad retraction. The retraction spring may be positioned on the modular pad clip to provide a desired retraction force. The location of the friction material arm of the retraction spring may therefore be customized depending upon the size of the brake pad, the thickness of the friction material, the amount of force to be exerted on the brake pad to cause it to retract, or combination thereof. For example, the clip can be assembled with a desired distance between the edge of the clip body section and the friction material arm of the retraction spring.

The discrete sections of the pad clip may be chosen for particular dimensions, properties, materials, or combination thereof, which may allow for customization of the modular pad clip. A discrete section may be selected for its length, width, thickness, shape, angles formed between segments, areas and features for attachment, the like, or combination thereof. For example, a bridge section may be chosen based on its length or location of attachment apertures or projections (e.g., bosses) to provide a sufficient distance between the clip body sections. Clip body sections may be selected based on the location and length of any of the segments. Clip body sections may be selected based on the angular relationship between segments of the clip body sections or angular relationships of a segment with another discrete section (e.g., the angle formed between the bridge section and the spacing segment of the clip body section or the angle formed between the abutment segment and the spring attachment segment and/or the sliding segment of the retraction spring). Clip body sections may be selected based on a desired width (e.g., a width that is at least as wide as the distance the brake pad travels within the brake system in an axial direction in relation to the rotor axis). The clip body sections may be non-handed so that the clip body section can fit on any projection and/or abutment of the brake assembly and so that costs and tooling are reduced. The clip body sections may differ (e.g., left handed and right handed) depending upon the location of the clip body within the brake assembly. Retraction springs may be chosen or formed based on the forces required to retract a brake pad in a particular brake assembly. The retraction springs may be non-handed so that a retraction spring can be used with any clip body section. The retraction springs may be different depending on the location of the retraction spring within the brake assembly, the brake pad being contacted, or both. For example, springs that exert different forces could be used with the inboard and outboard brake pads.

The discrete sections may be formed of the same material. The discrete sections may be formed from different materials. Any of the discrete sections may be made of any material that exhibits good plastic deformation and good elastic deformation characteristics. Any of the discrete sections may be formed from and/or include polymeric materials. Any of the discrete sections may be made of plastic. Any of the discrete sections may be made of metal or metal alloy (e.g., aluminum, stainless steel). Any of the discrete sections may be made of 301¾ hard stainless steel measured using STM A666. Any of the discrete sections may have a coating, such as a low friction coating (e.g., a rubber coating to minimize vibration), or a coating to resist corrosion. Any of the discrete sections may be made of or formed from a wire, sheet, band, tube, pipe, or the like. Preferably, the discrete sections are made of a sheet. Any of the discrete sections may be made of a stamped and formed sheet of metal. The material may be any size that allows the discrete section to exert a desired force. The material may be any size (e.g., thickness, diameter, gauge, length, width, or the like) that allows the discrete section to perform its desired function and be located within the brake assembly. Any discrete section may have a same or different thickness, diameter, gauge, length, width, the like, or combination thereof, from another discrete section of the modular pad clip.

The present pad clips may be formed using a method. The method may include one or more of the following steps performed in virtually any order. The discrete pieces may include one or more bridge sections, one or more clip body sections, one or more retraction springs, or combination thereof. The method of forming the pad clip may include forming one or more clip body sections, preferably two or more clip body sections, with each clip body section including a spring attachment segment, a bridge attachment segment, or both. The method of forming the pad clip may include forming one or more retraction springs. The method of forming the pad clip may include forming one or more bridge sections. The discrete pieces of the pad clip may be formed by any method, such as any type of metalworking or shaping technique (e.g., stamping, drawing, spinning, hammering, casting, extruding, molding, bending, the like, or combination thereof). Any of the discrete pieces may be formed from any material suitable for performing the desired function of the piece. The one or more retraction springs may be attached to the spring attachment segment of clip body section. The one or more bridge sections may be attached to the one or more clip body sections at the bridge attachment segment. Preferably, the bridge section is attached to two or more clip body sections at the bridge attachment segment to connect the two or more clip body sections yet maintain a distance between the two or more clip body sections that is sufficiently large so a rotor of the brake assembly can extend therethrough. Attaching of any of the discrete pieces to another discrete piece by any method of attachment (e.g., bonding, fusion techniques, melting, using adhesives, using fasteners (e.g., screws, rivets, pins, sheet-metal nuts, hinges, latches, detents, threaded fasteners), brazing, soldering, riveting, staking operations, peening, spot welding, crimping, clinching, the like, or combination thereof). Any of the discrete pieces may include one or more attachment apertures, preferably two or more attachment apertures, so that the pad clip can be customized to accommodate dimensions of the brake assembly and/or customized for a desired pad retraction force. The discrete pieces may be repositioned throughout the life of the brake assembly. For example, a pad retraction spring may be repositioned, or a new pad retraction spring may be attached, as the friction material of a brake pad wears. The method of forming a pad clip may include installing the pad clip about a support bracket of a brake assembly.

Figure 1:
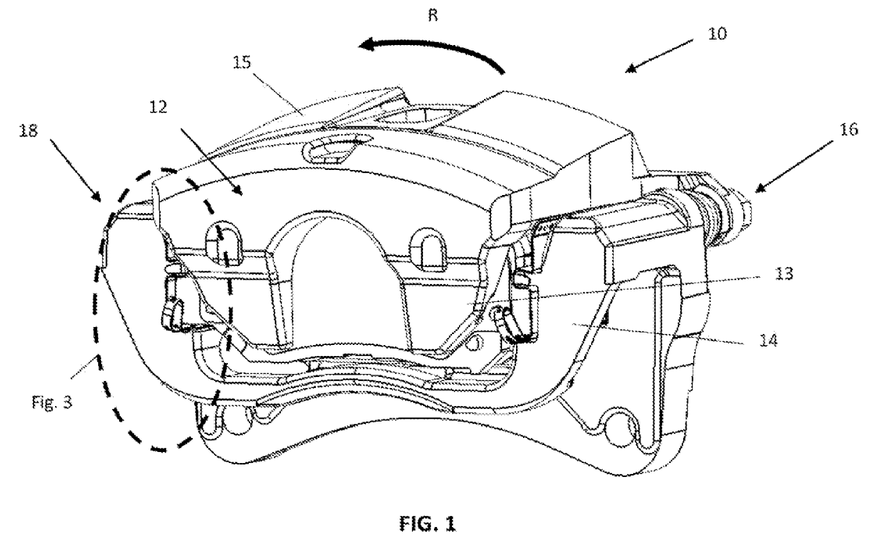
FIG. 1 illustrates a perspective view of a brake assembly.

FIG. 1 illustrates a perspective view of a brake assembly 10 having a leading end 16 and a trailing end 18. The brake assembly 10 includes a caliper 12 and a rotor (not shown) that rotates in direction (R). The caliper 12 includes a bridge 15 that extends between and connects one or more piston bores that house pistons (not shown) to one or more fingers 13. The brake assembly 10 also includes a support bracket 14 in communication with the caliper 12.

Figure 2:
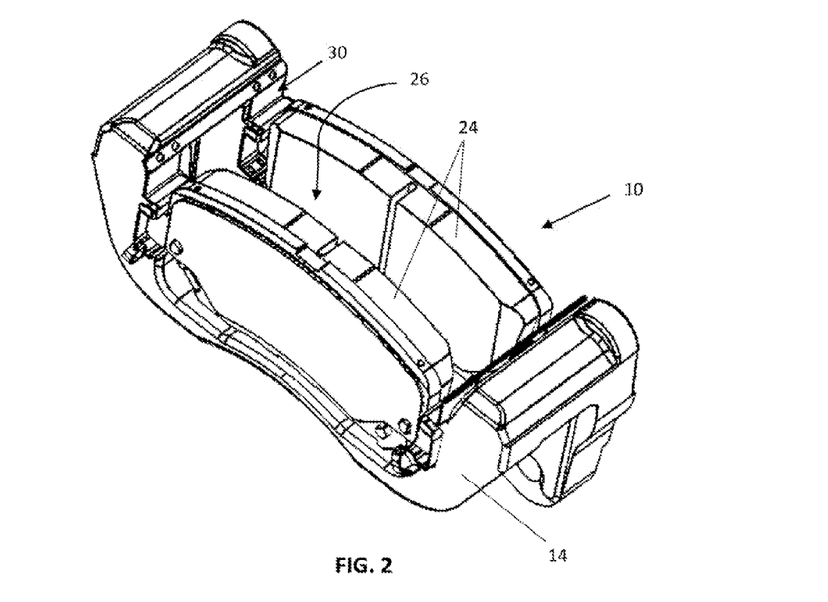
FIG. 2 illustrates a perspective view of a partial brake assembly including a pad clip of the teachings herein.

FIG. 2 is a top perspective view of a brake assembly 10 with the caliper removed. The support bracket 14 supports two brake pads 24 with a gap 26 therebetween to accommodate a rotor (not shown). A pad clip 30 located on each side of the support bracket 14 assists in holding the brake pads 24 in the support bracket 14.

Figure 3:
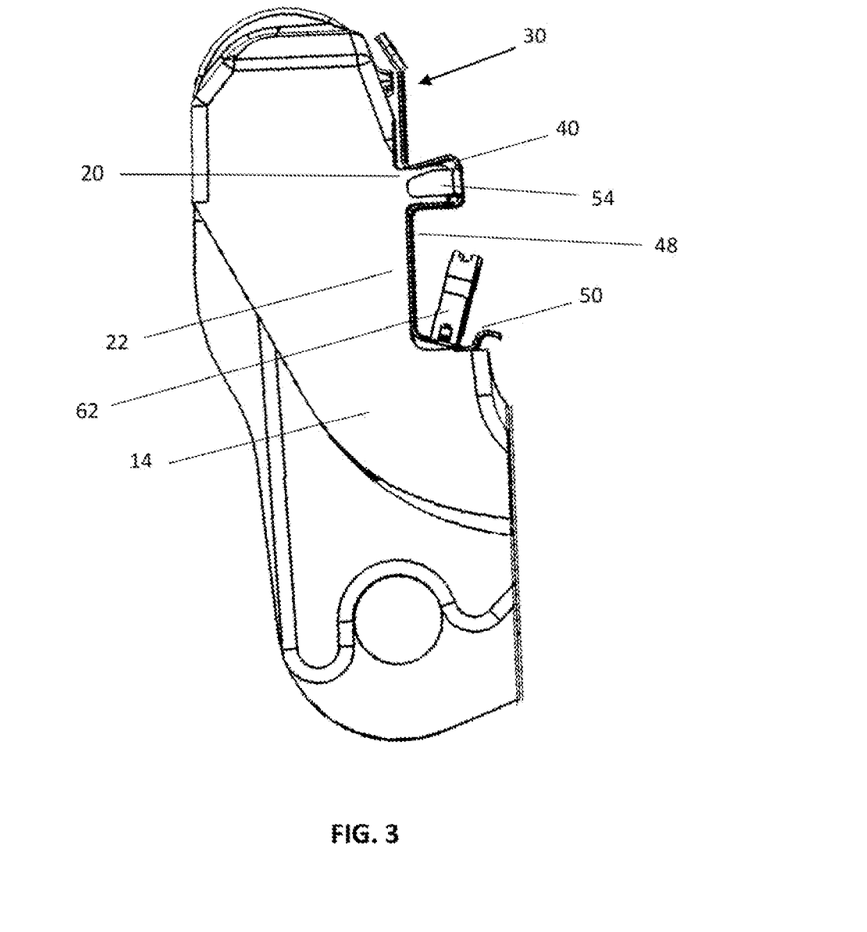
FIG. 3 illustrates an enlarged side view of the circled portion in FIG. 1 showing the pad clip on the support bracket.

FIG. 3 is a side view of an enlarged portion of FIG. 1. The pad clip 30 is positioned on the support bracket 14, with the projection segment 40 of the pad clip 30 generally matching the shape of the projection 20 of the support bracket 14 and the abutment segment 48 of the pad clip 30 generally matching the shape of the abutment 22. The pad clip 30 includes one or more securing tabs 54 to secure the pad clip 30 to the projection 20 of the support bracket 14. The pad clip 30 also includes a retraction spring 62 and a spring end 50 that engages with a brake pad (see FIG. 4).

Figure 4:
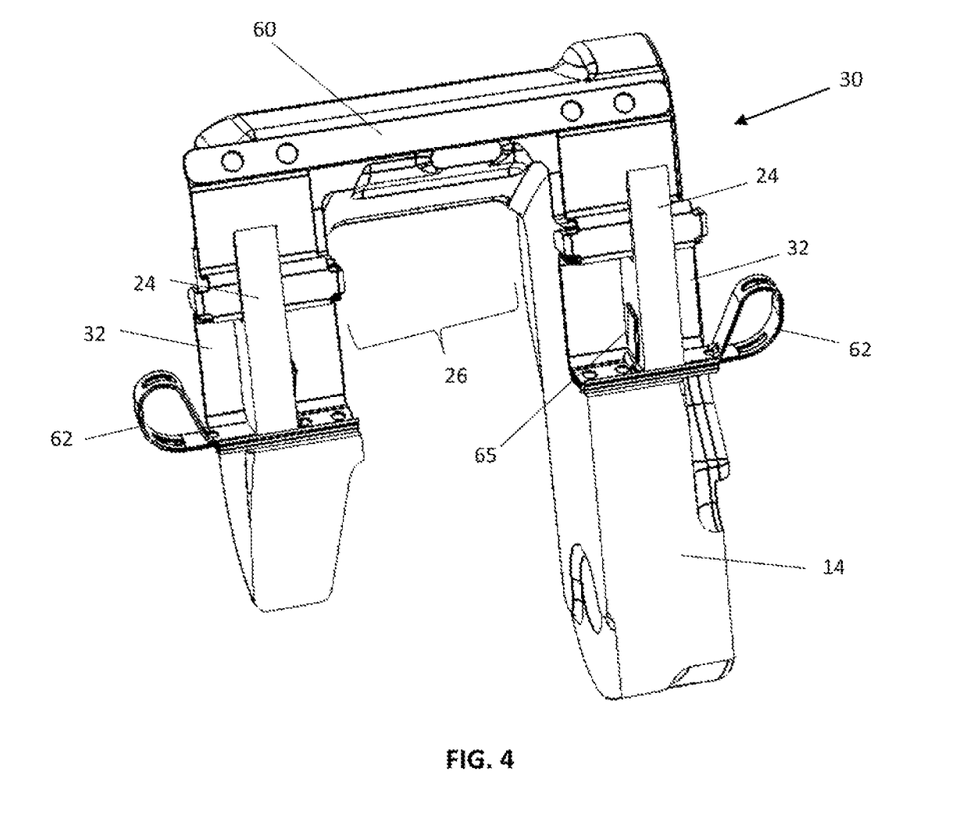
FIG. 4 illustrates a perspective view of an exemplary pad clip of the teachings herein installed on a support bracket.

FIG. 4 illustrates the pad clip 30 installed on the support bracket 14. The pad clip 30 includes two clip body sections 32 that each receive a portion of a brake pad 24 (shown only partially). The clip body sections 32 are joined by a bridge section 60 that extends over the gap 26 that accommodates a rotor (not shown). At the opposing end of each clip body section 32 is a retraction spring 62. The retraction spring has a friction material arm 65 which contacts the brake pad 24 and assists in causing the brake pad 24 to retract upon a brake release.

Figure 5:
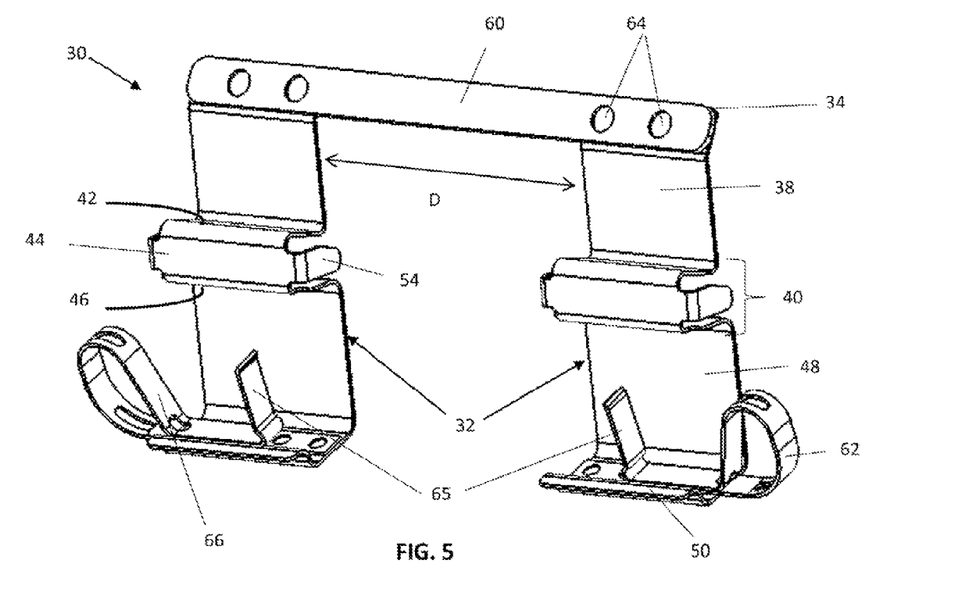
FIG. 5 illustrates a perspective view of an exemplary pad clip of the teachings herein.

FIG. 5 illustrates an assembled pad clip 30. The pad clip 30 includes two clip body sections 32. Each clip body section is shaped to generally match the shape of the support bracket (see FIGS. 3 and 4). The clip body section 32 includes a bridge end 34 and an opposing spring end 50. At the bridge end 34 is a bridge attachment segment 36 (see FIG. 7). A spacing segment 38 joins the bridge attachment segment 36 to a projection segment 40, which generally fits around a projection of a support bracket (see FIGS. 3 and 4). The projection segment 40 includes an upper portion 42, a face portion 44, and a lower portion 46. The lower portion 46 is joined to an abutment segment 48, which generally is located adjacent to the abutment 22 of the support bracket 14 (see FIG. 3). The abutment segment is connected to a spring attachment segment 52 (see FIG. 7). The clip body section 32 terminates at the spring end 50. The pad clip 30 further includes a bridge section 60, which connects two or more clip body sections 32 and separates them by a distance (D), which may be generally equal to the gap 26 of the support bracket 14 to accommodate the rotor of the brake assembly (see FIG. 4). The pad clip 30 further includes a retraction spring 62 connected to each clip body section 32 at the spring attachment segment 52 (see FIG. 7). The retraction spring 62 includes a friction material arm 65, which assists in retracting a brake pad 24 (see FIG. 4) and a pressure plate arm 66.

Figure 6:
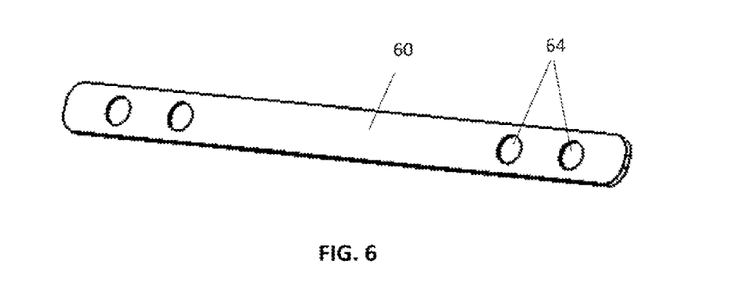
FIG. 6 illustrates a perspective view of an exemplary bridge section.

FIG. 6 illustrates an exemplary bridge section 60. The bridge section 60 includes two or more attachment apertures 64 for attaching the bridge section 60 to the clip body sections 32 of the pad clip.

Figure 7:
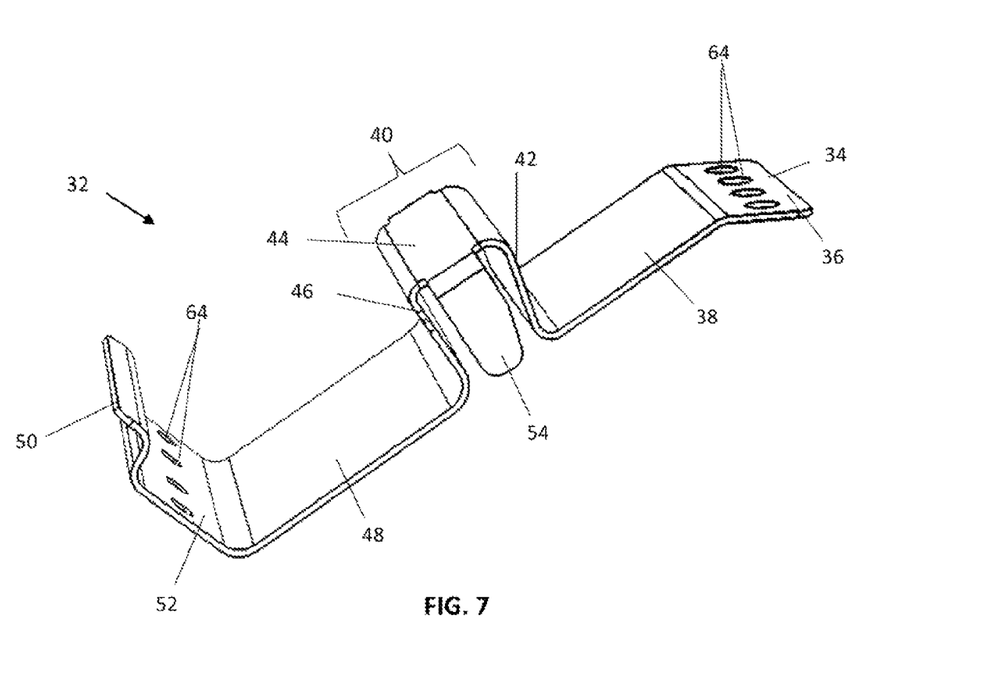
FIG. 7 illustrates a perspective view of an exemplary clip body section.

FIG. 7 illustrates an exemplary clip body portion 32. The clip body portion 32 includes a bridge end 34 and a spring end 50. At the bridge end 34 is a bridge attachment segment 36 including attachment apertures 64 for attaching the bridge section of FIG. 6. The bridge attachment segment 36 is joined to a spacing segment 38, which connects to a projection segment 40. The projection segment includes an upper portion 42, a face portion 44, and a lower portion 46 and also includes one or more securing tabs 54 for securing the clip body portion 32 to the support bracket. The projection segment 40 connects to an abutment segment 48, which connects to a spring attachment segment 52 and terminates at the spring end 50. The spring attachment segment 52 includes attachment apertures 64 for attaching a retraction spring 62 (see FIG. 8) to the clip body portion 32.

Figure 8:
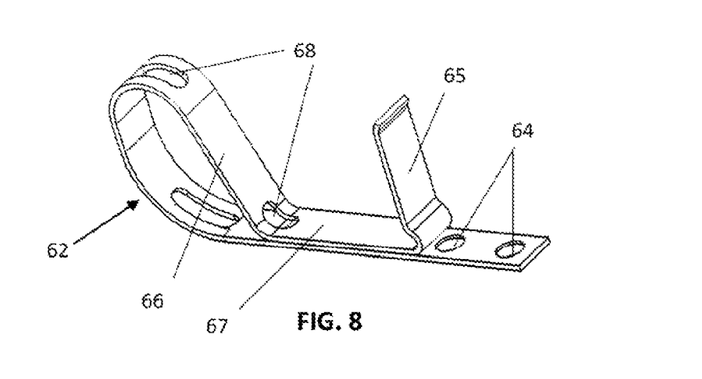
FIG. 8 illustrates a perspective view of an exemplary retraction spring.

FIG. 8 illustrates a retraction spring 62. The retraction spring 62 includes one or more attachment apertures 64 for attaching the retraction spring to the clip body section 32 (see FIG. 5). The retraction spring includes a friction material arm 65 for assisting in retracting a brake pad during a brake release. The retraction spring also includes a pressure plate arm 66 located on the opposing side of the brake pad and a sliding segment 67 for the brake pad to move along during a brake apply and a brake retract. The retraction spring 62 further includes cutouts 68 which reduce the weight of the spring, create sites for localized yielding of the pad spring as the brake pads wear, and/or also allow the spring to be shaped (e.g., bent or otherwise formed) from a single piece.

Any numerical values recited herein include all values from the lower value to the upper value in, increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 5 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A pad clip comprising:
   two or more separate and discrete pieces comprising:
   a) one or more clip body sections, each clip body section including a bridge attachment segment located at a bridge end of the clip body section, a spring attachment segment located at a spring end of the clip body section, or both; and
   b) a bridge section, one or more retraction springs, or both;
   wherein the pad clip is a modular pad clip so that a configuration of the pad clip can be customized; and
   wherein the two or more separate and discrete pieces are adapted to be attached together at the bridge attachment segment, spring attachment segment, or both.

2. The pad clip of claim 1, wherein the two or more separate and discrete pieces of the pad clip include the bridge section attached to the bridge attachment segments of two clip body sections so that the two clip body sections are separated by a distance and are connected by the bridge section.

3. The pad clip of claim 1, wherein the two or more separate and discrete pieces of the pad clip include the one or more retraction springs attached to the spring attachment segment of the one or more clip body sections.

4. The pad clip of claim 1, wherein at least one of the two or more separate and discrete pieces has one or more attachment apertures for attaching the two or more separate and discrete pieces.

5. The pad clip of claim 4, wherein at least one of the two or more separate and discrete pieces has two or more attachment apertures so that the pad clip can be customized for fit and/or spring force within a brake system.

6. The pad clip of claim 1, wherein the two or more separate and discrete pieces are attached by a staking operation, spot welding, peening, or combination thereof.

7. The pad dip of claim 1, wherein the two or more separate and discrete pieces are formed from different materials.

8. The pad clip of claim 1, wherein the two or more separate and discrete pieces have different thicknesses.

9. The pad dip of claim 1, wherein at least one of the two or more separate and discrete pieces is coated with a coating prior to assembling the pad clip.

10. The pad clip of claim 1, wherein the one or more clip body sections are formed to generally match a shape of a support bracket of a brake assembly.

11. The pad clip of claim 1, wherein the one or more clip body sections is non-handed so that the one or more clip body sections are able to fit on any projection and/or abutment of a brake assembly.

12. A brake assembly, comprising:
   a) a caliper;
   b) a support bracket having a leading end and a trailing end, wherein the leading end, the trailing end, or both, have one or more projections;
   c) a rotor extending through the support bracket;
   d) two or more brake pads located within the support bracket on opposing sides of the rotor; and
   e) a modular pad clip that allows a configuration of the pad clip to be customized located about the leading end of the support bracket, trailing end of the support bracket, or both, wherein the modular pad clip comprises a plurality of separate and discrete pieces adapted to be attached to each other including:
      i. two clip body sections,
         wherein the two clip body sections each include a bridge attachment segment located at a bridge end of the clip body section and a spring attachment segment located at a spring end of the clip body section;
      ii. a bridge section attached to the two clip body sections at the bridge attachment segment so that the two clip body sections are connected yet separated by a distance that is sufficiently large so that the rotor can extend therethrough; and
      iii. one or more retraction springs attached to the spring attachment segment of each of the two clip body sections.

13. The pad clip of claim 12, wherein the two clip body sections, the bridge section, the one or more retraction springs, or combination thereof, include one or more attachment apertures for attaching the plurality of separate and discrete pieces together.

14. The pad clip of claim 13, wherein at least one of the plurality of separate and discrete pieces has two or more attachment apertures so that dimensions of the modular pad clip can be customized to fit the modular pad clip within the brake system.

15. The pad clip of claim 12, wherein the plurality of separate and discrete pieces are attached by a staking operation, spot welding, peening, or combination thereof.

16. The pad dip of claim 12, wherein two or more of the plurality of separate and discrete pieces have different thicknesses, are formed from different materials, or both.

\* \* \* \* \*

UNITED STATES PATENT AND TRADEMARK OFFICE
CERTIFICATE OF CORRECTION

| | |
|---|---|
| PATENT NO. | : 9,677,629 B2 |
| APPLICATION NO. | : 14/467115 |
| DATED | : June 13, 2017 |
| INVENTOR(S) | : Brian Lewis Boyle and Gang Lou |

It is certified that error appears in the above-identified patent and that said Letters Patent is hereby corrected as shown below:

In the Claims

Column 16, Line 17, delete "pad dip of" and replace with --pad clip of--

Column 16, Line 27, delete the "," after "A brake assembly"

Signed and Sealed this
Fifth Day of September, 2017

Joseph Matal
*Performing the Functions and Duties of the*
*Under Secretary of Commerce for Intellectual Property and*
*Director of the United States Patent and Trademark Office*